United States Patent
Takano et al.

(10) Patent No.: US 9,557,491 B2
(45) Date of Patent: Jan. 31, 2017

(54) OPTICAL FIBER ADAPTER

(71) Applicant: SENKO ADVANCED COMPONENTS, INC., Marlborough, MA (US)

(72) Inventors: Kazuyoshi Takano, Westborough, MA (US); Yim Wong, Marlborough, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 14/741,268

(22) Filed: Jun. 16, 2015

(65) Prior Publication Data

US 2016/0131849 A1    May 12, 2016

Related U.S. Application Data

(60) Provisional application No. 62/013,216, filed on Jun. 17, 2014.

(51) Int. Cl.
G02B 6/38    (2006.01)

(52) U.S. Cl.
CPC ......... G02B 6/3825 (2013.01); G02B 6/3874 (2013.01)

(58) Field of Classification Search
CPC ........................ G02B 6/3825; G02B 6/3874
See application file for complete search history.

(56) References Cited

U.S. PATENT DOCUMENTS 4,818,061 A * 4/1989 Iwano ................ G02B 6/3854
385/72

* cited by examiner

*Primary Examiner* — Ryan Lepisto
*Assistant Examiner* — Erin Chiem
(74) *Attorney, Agent, or Firm* — Pepper Hamilton LLP

(57) ABSTRACT

An adapter for mating optical fiber connectors may include an internal configuration that essentially holds the ferrules of the connectors in alignment when a force is applied to the connector in a sideways direction. An internal plate may be provided to essentially prevent displacement of the mating ends of the ferrules with respect to the adapter housing and one another.

18 Claims, 7 Drawing Sheets

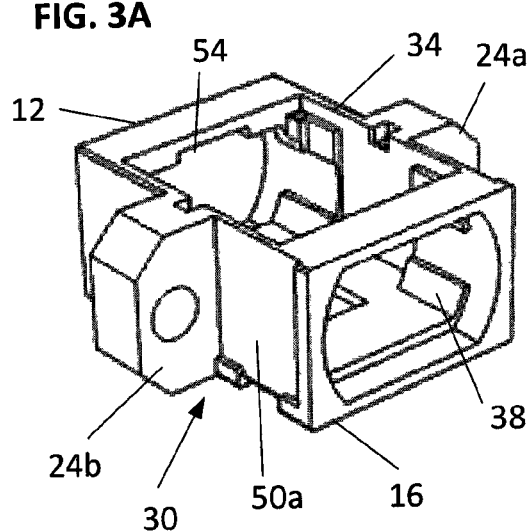
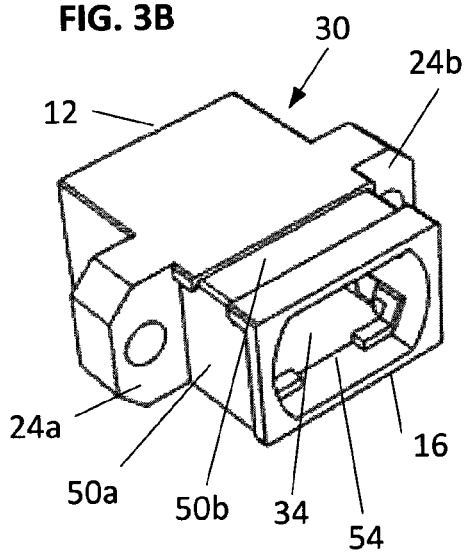
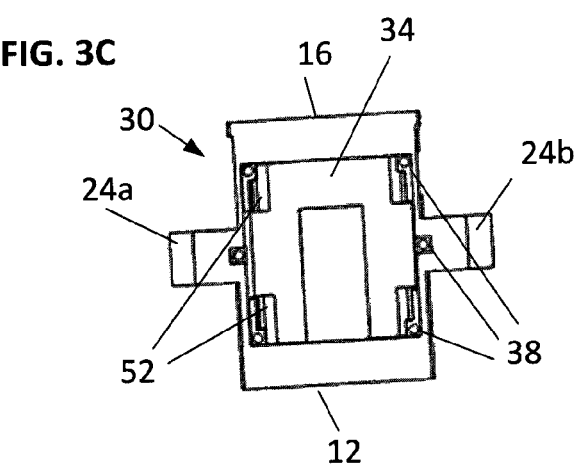
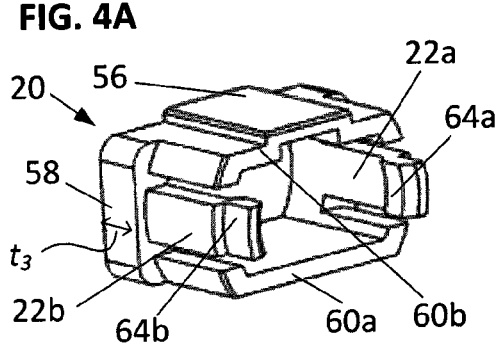
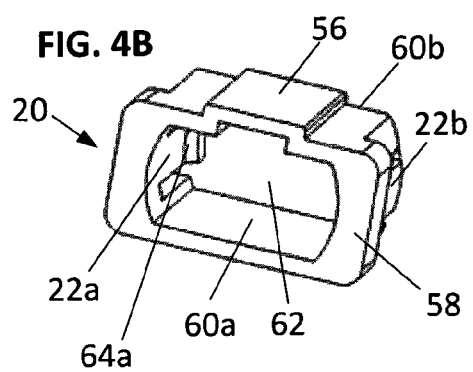

OPTICAL FIBER ADAPTER

CROSS REFERENCE TO RELATED APPLICATIONS

This application claims the benefit of U.S. Provisional Application No. 62/013,216 filed on Jun. 17, 2014, the contents of which are incorporated by reference in their entirety as if fully set forth herein.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds.

Individual optical fibers are extremely small. For example, even with protective coatings, optical fibers may be only about 250 microns in diameter (only about 4 times the diameter of a human hair). As such, hundreds of fibers can be installed in cables that will take up relatively little space. For connections between cables, however, the fibers are terminated with connectors. Multiple fibers may be arranged within a single connector. For example, multi-fiber connectors such as those using multi-fiber push-on/pull-off (MPO) technology may contain and connect 12 or 24 fibers. Connectors, such as MPO type connectors, generally include a housing portion that contains a ferrule that terminates the ends of the fibers. Ferrules are generally used to retain the ends of the optical fibers for connecting the optical fibers. One type of optical ferrule that may be used with MPO type connectors is an MT (Mechanically Transferable) ferrule.

Typically, MPO connectors are joined together to connect the optical transmission path of one fiber optic cable to another fiber optic cable or device, and the connection may be made by inserting the MPO connectors in an MPO adapter. An adapter generally includes a housing, or portion of a housing, having at least one port which is configured to receive and hold a connector to facilitate the optical connection of the connector ferrule with the ferrule of another connector or other device. Adapters may be used to facilitate connections contained within a chassis. The term "chassis" as used herein broadly refers to a containment structure for housing electrical components or switching components.

Ferrules, disposed within the connector housings, get pushed together within the adapter to optically connect the ferrules by means of a so-called PC (Physical Contact) connection, wherein the optical fibers in one ferrule contact the optical fibers in the other ferrule and get compressed together to provide an optical connection. Optical transmission performance between the optical fibers is strongly dependent on connecting conditions such as axis alignment and inclination of the optical fibers, and gaps between the opposing optical fibers.

Any slight misalignment or incorrect inclination of ferrules may degrade the quality of the signal being transmitted. In a chassis-type system, for example, wherein the adapter is mounted to a surface, a plugged-in connector of the adapter may be accidentally bumped or displaced, thereby causing movement of the ferrule of the displaced connector relative to the adapter and/or the ferrule of another connector mounted thereto.

Such a sideways force, or side-loading, on an MPO connector that is mated with another MPO connector generally results in an increase in Insertion Loss (attenuation) of the power as the signal being carried exits one MPO connector and enters the mated MPO connector. Side loading may result in a microscopic separation between the contacting surfaces of mated MPO ferrules, and such a separation creates an air gap between the otherwise contacting end surfaces of the mated ferrules. Any amount of air present between the contacting surfaces of optical connectors may act as a restriction to the light wave passage and, although not a total loss in transmission, may result in fractional power loss. It is desirable to eliminate any power losses present in any fiber optic network.

Therefore, in order to reduce or eliminate potential power loss within an adapter, there remains a need for minimizing movement of connector ferrules after installation in an adapter.

SUMMARY

To prevent, or at least minimize, movement of ferrules within an adapter after the optical fiber connectors are plugged into the adapter, an adapter may be provided with an internal configuration that essentially holds the ferrules in alignment. Thus, when a force is applied to a connector in a sideways direction (a force that has a component that is not parallel to the installation or plug-in direction), movement of the protruding contact end of the corresponding ferrule within the adapter and/or with respect to the opposing ferrule in the adapter, may at least be minimized, if not completely prevented. In an embodiment, the adapter may be an MPO optical fiber adapter, the connectors may be MPO optical fiber connectors, and the ferrules may be MT ferrules.

In an embodiment an optical fiber adapter is provided for optically coupling two optical fiber connectors, wherein each optical fiber connector has an optical ferrule with a mating end for mating with the mating end of the optical ferrule of the other connector. The adapter includes a housing having a first end, a second end opposite the first end, and defines an axial cavity extending from the first end to the second end, and each of the first end and the second end being configured for receiving and selectively retaining one of the optical fiber connectors therein for mating of the mating ends of the optical ferrules at a mating location within the housing. The housing includes a wall portion disposed at the mating location and orthogonal to the axial cavity, and the wall portion includes an opening therein for the axial cavity and a perimetrical surface defining the opening, wherein the opening has a cross-sectional configuration for unhindered passage of the mating ends of the optical ferrules therethrough, and the wall portion, at least adjacent the opening, has a wall thickness sufficient for engagement of the mating ends of the optical ferrules with the perimetrical opening upon displacement of the mating ends in any direction orthogonal to the axial direction to limit lateral movement of the mating ends and substantially maintain an optical coupling between the mating ends.

BRIEF DESCRIPTION OF THE FIGURES

FIGS. 3A-3C depict various views of an MPO adapter housing according to an embodiment.

FIGS. 4A and 4B depict various views of an MPO adapter clip according to an embodiment.

DETAILED DESCRIPTION

Figure 1A:
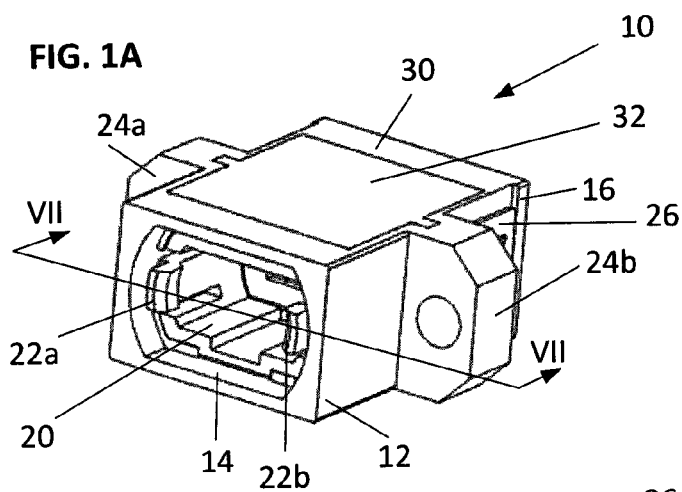
FIGS. 1A and 1B depict perspective views of an MPO adapter according to an embodiment.
Figure 1B:
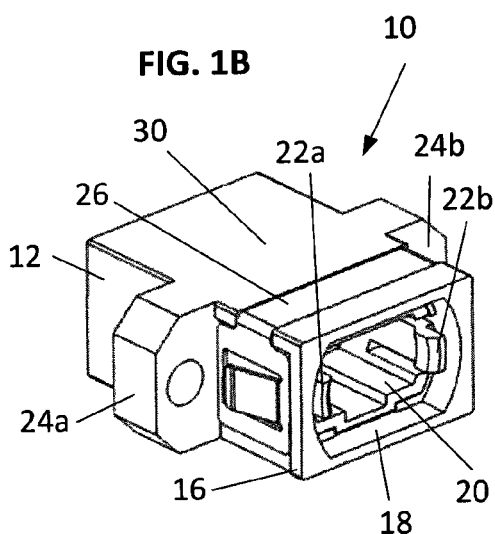

While the following description is directed towards MPO adapters and MPO connectors with MT optical ferrules, the embodiments described may be applicable to other adapters, connectors and ferrule types as well. As represented in the embodiments of FIGS. 1A and 1B, an MPO adapter 10 may include a first end 12 having a first plug-in port 14 for receiving an MPO optical fiber connector therein, and may include a second end 16 having an additional plug-in port 18 for receiving an additional MPO optical fiber connector therein.

For retention of an MPO connector within each of the ports 14, 18, the ports may be provided internally with a connector clip 20. The clips 20 (shown in isolated views in FIGS. 4A and 4B) may include resilient tabs 22a and 22b configured to be displaceable outwardly for insertion and removal of a connector into or out of the ports 14, 18, and return to essentially their original position to engage and retain a connector in the ports. For adapters 10 configured to be mounted on a chassis panel, mounting flanges 24a, 24b may be provided on the adapter to mount the adapter via screws, for example, or alternatively, a panel mounting clip 26 may be provided on one end of the adapter.

Figure 2:
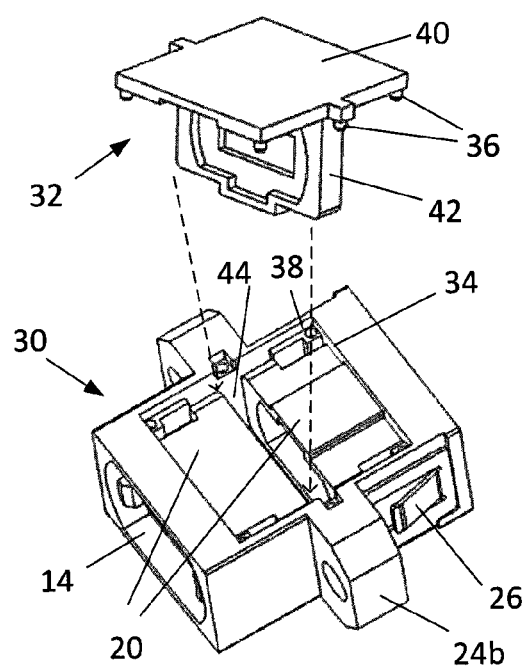
FIG. 2 depicts a partially disassembled view of an MPO adapter with adapter cover removed according to an embodiment.

As shown in additional detail in FIG. 2, an adapter 10 may include a housing 30 and a housing cover 32. The housing 30 (shown in isolated views in FIGS. 3A-3C) may include a corresponding opening 34 configured for receipt of the cover 32 therein as shown in FIG. 1A. The connector clips 20 may be installed in the housing 30 via the opening 34. Each clip 20 may be independently inserted into the housing 30 through the opening 34 and then slid and fit into position as shown. The housing cover 32 may be installed to enclose the clips 20 within the housing 30. In an embodiment, the housing cover 32 may be ultrasonically welded to the housing 30. Alternatively, as represented in the drawings, the housing cover 32 may include a plurality of engagement projections 36 that frictionally engage within corresponding receptacles 38 of the housing 30. In an embodiment as depicted, the housing 30 and housing cover 32 may include six such projections 36 and corresponding receptacles 38. Various alternate embodiments of the housing cover 32 and the housing 30 as well as the method of attaching the cover to the housing may be provided, for example, by adhesive.

In an embodiment, and as described in more detail herebelow, the cover 32 may include a housing wall portion 40 and an insert plate 42 that extends substantially orthogonally to wall portion to fit between the clips 20 in the insert gap 44. Upon insertion of the plate 42 into the gap 44 the clips 20 may be retained in place within the housing 30.

FIGS. 3A and 3B provide isolated perspective views of the housing 30, and FIG. 3C provides an overhead view looking down into the housing 30 through the opening 34. In an embodiment as shown in FIGS. 3A and 3B, the housing 30 may include side-wall and bottom depressions 50a, 50b configured for receiving the panel mounting clip 26 therein so that the clip is maintained in place on the housing. In addition, internally within the housing 30, stops 52 may be provided to retain the clips 20 within the housing and prohibit the clips from being pushed or pulled through the ends 12, 16. The interior of the housing 30 may also include alignment features, such as notches 54, for mating with projections 56 of the clips 20 (see FIGS. 4A, 4B) to ensure that the clips are properly installed within the housing.

As shown in FIGS. 4A and 4B, a clip 20 may include a base 58 and wall portions 60a, 60b that extend substantially orthogonally from the base. Resilient tabs 22a, 22b may also extend substantially orthogonally from the base 58 so that the tabs and wall portions 60a, 60b define a central internal cavity 62 for receiving an optical fiber connector therein. The protruding ends of resilient tabs 22a, 22b may be provided with catches 64a, 64b for engaging with a connector to retain the connector within the opening once inserted therein.

FIGS. 5A-5D provide various additional views of the housing cover 32. As mentioned previously, and as also represented in FIGS. 6A-6D, housing cover 32 includes an insertion plate 42 that is configured to fit between the two clips 20 when inserted into the housing 30. The insertion plate 42 may have a thickness $t_1$ (FIG. 5B) that matches the width of the insert gap 44 (FIGS. 6A and 6C) that exists between clips 20 after positioning of the clips within the housing 30.

Figure 6C:
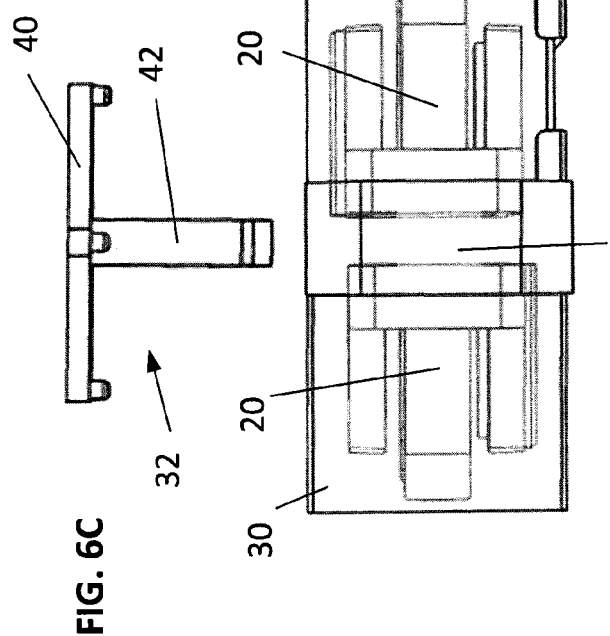
FIGS. 6A-6D depict components of an MPO adapter and relative fitting-together of the components according to an embodiment.
Figure 6D:
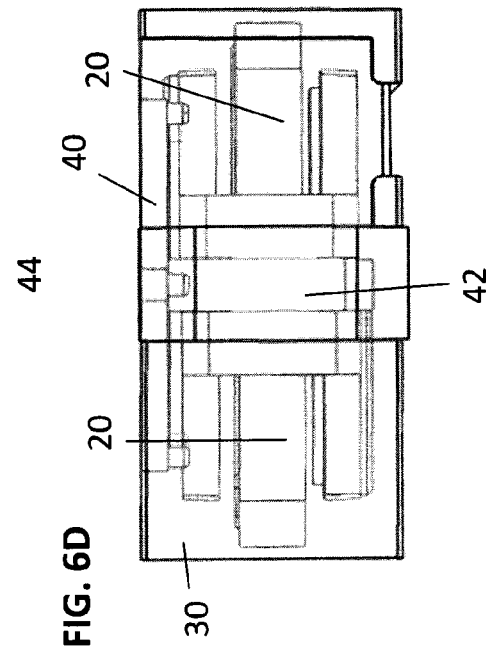
Figure 6A:
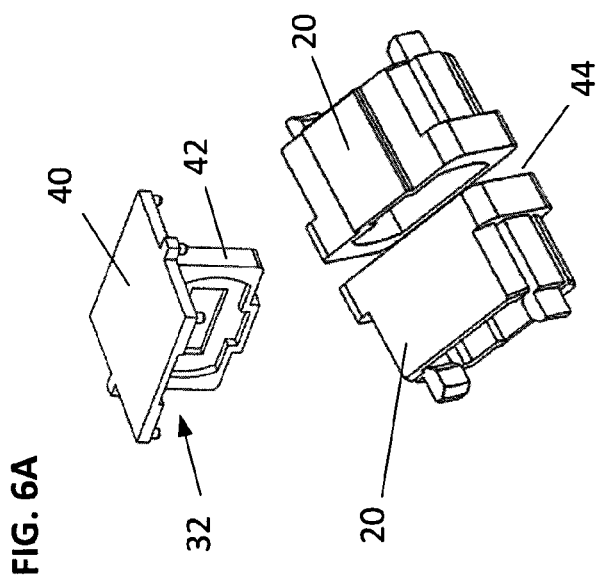
Figure 6B:
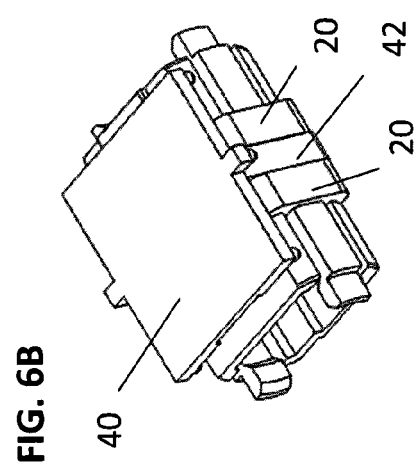

FIG. 6A provides a perspective view of two clips 20 positioned in relation to one another as they may be positioned within a housing, as also shown in a side view in FIG. 6C with the overlay outline of a housing 30. FIGS. 6A and 6C also provide a representation of a housing cover 32 in general relative positioning for insertion of the plate 42 between the clips 20. FIG. 6B provide an assembled views of the housing cover 32 and two clips 20 positioned in relation to one another as they may be positioned within a housing, as also shown in a side view in FIG. 6D with the overlay outline of a housing 30.

Figure 5A:
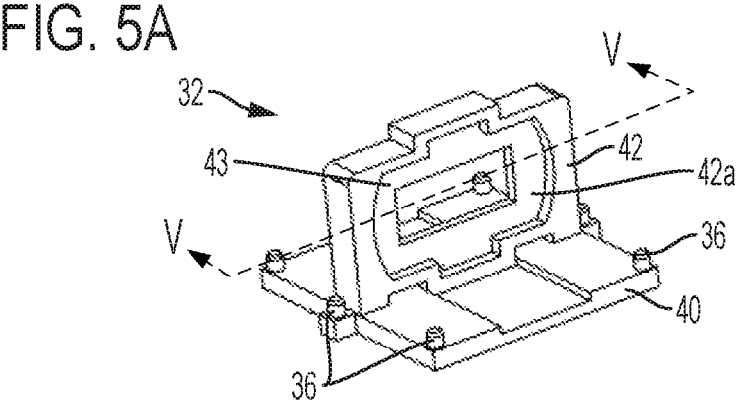
FIGS. 5A-5D depict various views of an adapter cover with insert according to an embodiment.
Figure 5B:
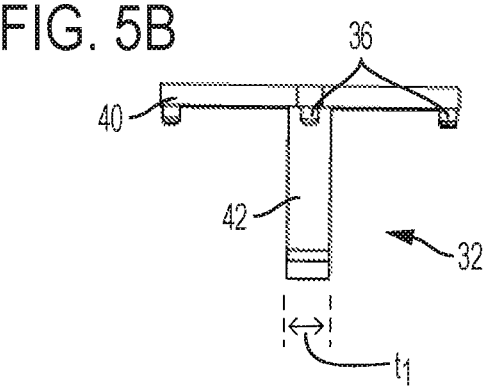
Figure 5C:
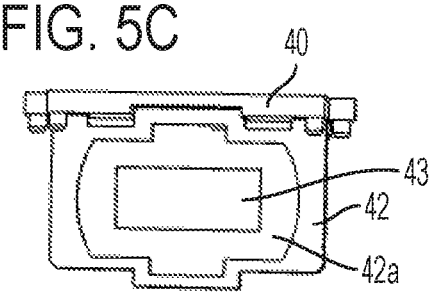
Figure 5D:
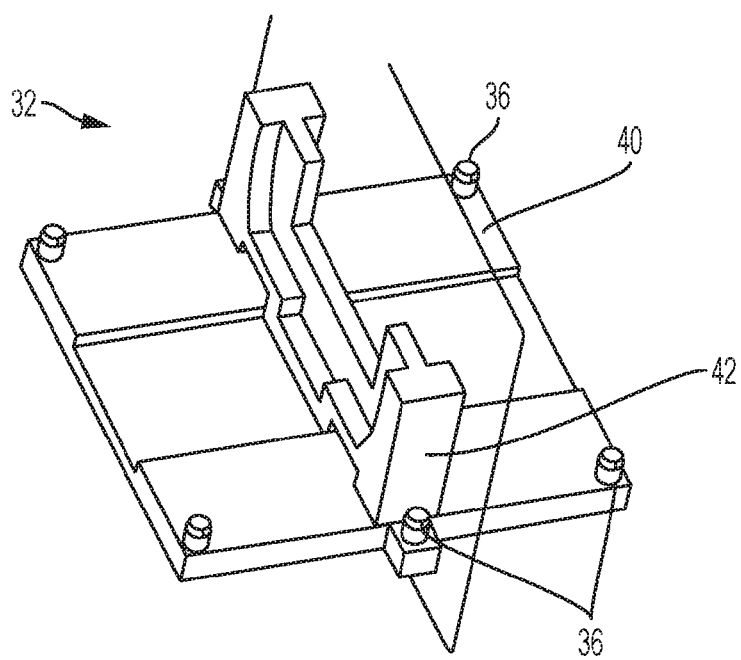

As shown in FIGS. 5A and 5C, insertion plate 42 may include an inner wall portion 42a that may be of a thickness $t_2$ (see FIG. 7B) that is less than the thickness $t_1$ and which includes an inner opening 43 provided for allowing contact between mating ferrules within the housing as discussed further below.

Figure 7A:
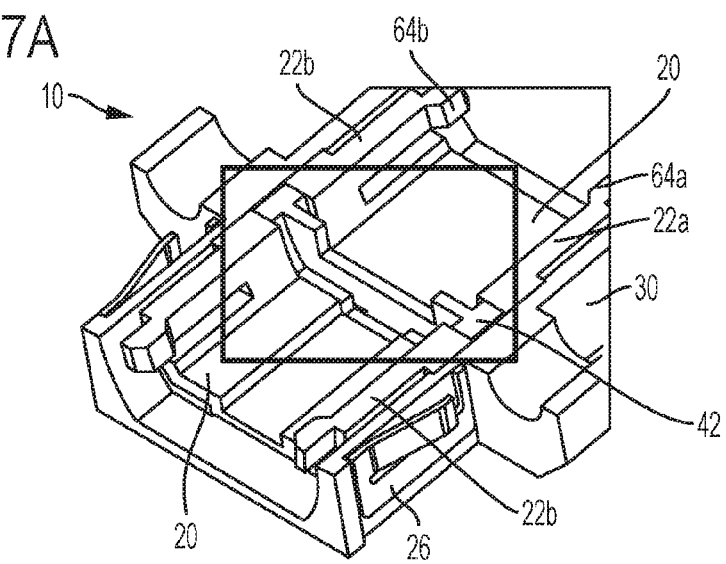
FIGS. 7A and 7B provide cross-sectional views of an assembled MPO adapter along line VII-VII of FIG. 1 according to an embodiment.
Figure 7B:
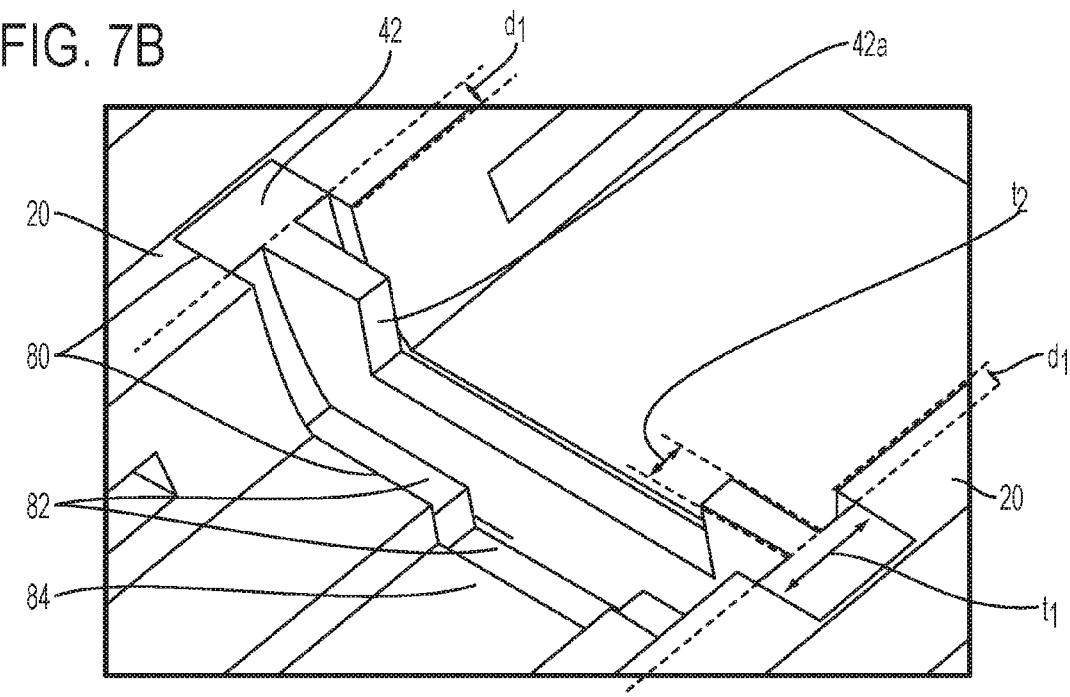

FIG. 7A provides a cross-sectional view of an assembled adapter 10 taken along line VII-VII of FIG. 1A, and FIG. 7B shows an enlarged detail of the rectangular section marked in FIG. 7A. As shown in FIG. 7B, the internal wall portion 42a of the insertion plate 42 may have a thickness $t_2$ that is less than the thickness $t_1$ of the plate 42. In an embodiment, the internal wall portion 42a may have a thickness $t_2$ that is sufficient to provide a perimetrical surface around the opening 43 that may be of a size sufficient to engage with and at least minimize lateral movement of a ferrule disposed within the adapter.

Figure 8A:
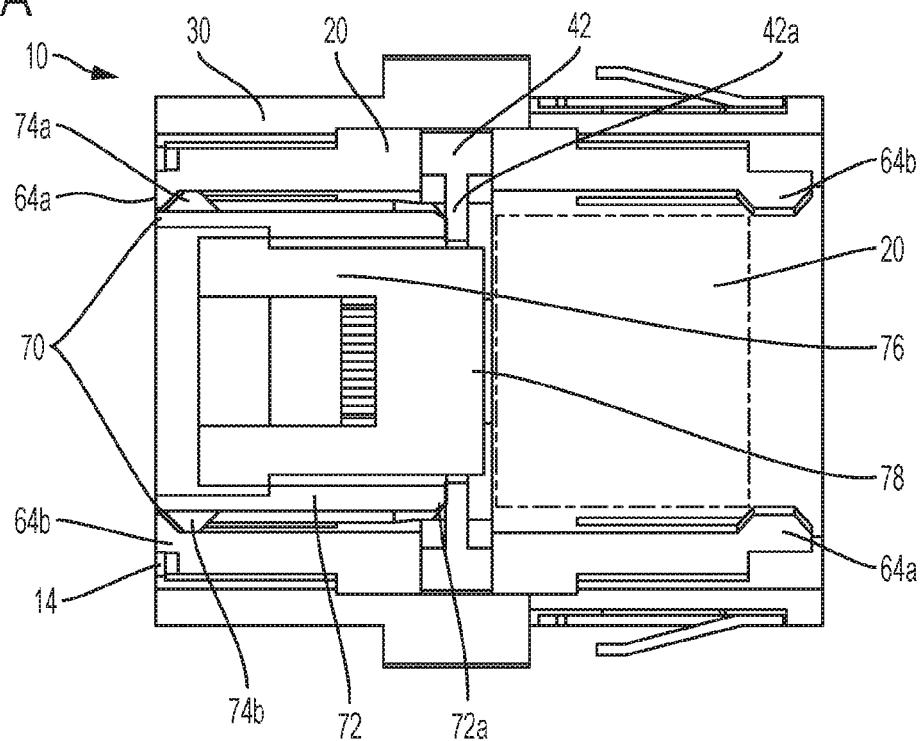
FIGS. 8A and 8B provide cross-sectional representations of an MPO adapter with a representative MPO connector and MT ferrule installed according to an embodiment.

FIG. 8A provides a cross-sectional view of an assembled adapter 10 having one optical fiber connector 70 inserted within a port 14 of the adapter. As shown, a connector 70 may include a connector housing 72 that fits within a clip 20. The connector housing 72 may include projections 74a, 74b that engage within the catches 64a, 64b of the clip 20 to retain the connector within the adapter 10. In the inserted position, a leading end 72*a* of the connector housing 72 may approach, and in an embodiment as shown, contact the internal wall portion 42*a* of the insertion plate 42.

In an embodiment as represented in FIG. 8A, the leading end 72*a* of the connector housing 72 may pass over the joint 80 (shown in more detail in FIG. 7B) that forms between the insertion plate 42 and adjoining clip 20. Since slight inaccuracies in molded parts may occur when the parts are being formed, and/or misalignments may occur during assembly, it would be undesirable for the internal profile 82 of the insertion plate 42 to protrude into the path of the connector housing, as this may cause a problem with insertion of the housing into the adapter, and/or misalignment of the ferrules. To avoid this type of problem, the internal profile 82 of the insertion plate may be larger than the internal profile 84 within a clip 20 by an amount $d_1$, thereby essentially removing the possibility that the profile of the insertion plate may protrude into the path of the connector housing.

The connector 70 may include a ferrule 76 within the connector housing 72, and the ferrule may be biased outwardly away from the connector (by a biasing member, not shown) so that a mating end 78 of the ferrule protrudes from the connector 70 as shown in FIG. 8A. Opening 43 within the internal wall portion 42*a* of the insertion plate 42 may be sized to allow uninhibited passage of the ferrule end 78 therethrough. In an embodiment, without the presence of a second connector within the adapter 10, as shown in FIG. 8A, the mating end 78 of the ferrule 76 may extend completely through the opening 43. In an embodiment, it would be undesirable for the ferrule end 78 to engage the internal wall portion 42*a* upon insertion of a connector 70 into an adapter 10 to avoid improper mating of ferrules within the adapter. Since a degree of misalignment and/or play may occur during insertion of a connector 70 into an adapter 10, in an embodiment, the dimensions of the opening 43 may be larger than the dimensions of the ferrule end 78 by about 0.2 mm to about 0.6 mm.

In an embodiment, an MT ferrule, for example, may have dimensions of about 6.4±0.1 mm×2.5±0.1 mm. A corresponding opening 43 may have a width of about 6.7 mm to about 6.9 mm and a height of about 2.8 mm to about 3.0 mm. In general, an opening 43 may be larger than the ferrule end 78 by a factor of at least about 1.03 (6.7 mm/6.5 mm) and at most about 1.25 (3.0 mm/2.4 mm). In various embodiments for an MPO connector of the dimensions indicated, the width of the opening may be about 6.7 mm, about 6.72 mm, about 6.74 mm, about 6.76 mm, about 6.78 mm, about 6.80 mm, about 6.82 mm, about 6.84 mm, about 6.86 mm, about 6.88 mm, or about 6.9 mm, or any value between any of the listed values, and the height may be about 2.80 mm, about 2.82 mm, about 2.84, about 2.86 mm, about 2.88 mm, about 2.90 mm, about 2.92 mm, about 2.94 mm, about 2.96 mm, about 2.98 mm, or about 3 mm, or any value between any of the listed values.

For embodiments, the minimum dimensions of the opening may be configured in conjunction with the maximum dimensions of the ferrule so that insertion of the ferrule into the opening is not obstructed by the wall defining the opening. In addition, the maximum dimensions of the opening may be configured in conjunction with the minimum dimensions of the ferrule so that any movement of the ferrule within the opening will result in contact of the ferrule with the wall in a manner as discussed below.

Figure 8B:
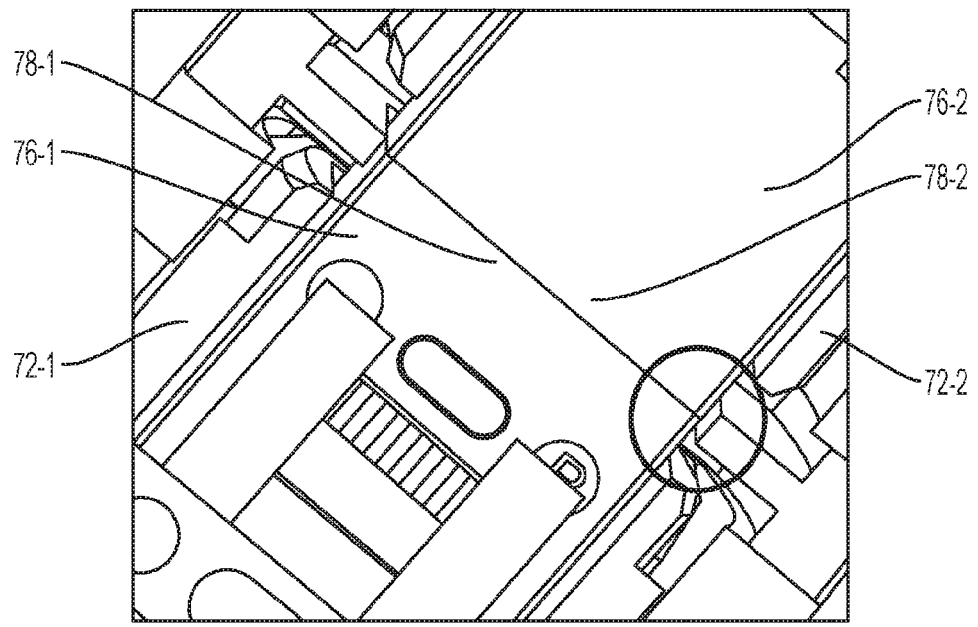

In an embodiment, as represented in FIG. 8B, upon insertion of a second connector 70 into the opposing end of the adapter 10, the biasing forces of the opposing ferrules 76-1 and 76-2 may essentially be equalized as the mating ends 78-1 and 78-2 mate with one another. With essentially equal biasing force, the mating ends 78-1 and 78-2 should mate with one another at essentially the center of the wall portion 42*a* (shown in the featured circle in the lower right of FIG. 8B).

The mated ferrules 76-1, 76-2 within the adapter 10 provide a Physical Contact (PC) connection, wherein the optical fibers in one ferrule contact the optical fibers in the other ferrule and get compressed together to provide an optical connection. With this type of connection, optical transmission performance between the optical fibers is strongly dependent on connecting conditions such as axis alignment and inclination of the optical fibers, and gaps between the opposing optical fibers.

If a plugged-in connector 72-1, 72-2 were to be accidentally bumped or displaced, thereby causing movement of the corresponding ferrule 76-1, 76-2 an increase in Insertion Loss (attenuation) of the power of the signal being carried by the optical fibers may occur as a microscopic separation between the contacting surfaces of mated ferrules may result. In order to hold the corresponding ferrules 76-1, 76-2 of the two connectors 72-1, 72-2 in good alignment within the coupling adapter 10, additional internal structure of the wall insert 42 provided by new structural surfaces 81-1, 81-2 (shown in FIG. 9B and defined by the thickness of the wall portion 42*a*), may be provided to negate the effects of side loads placed onto one or both of the connectors.

Figure 9A:
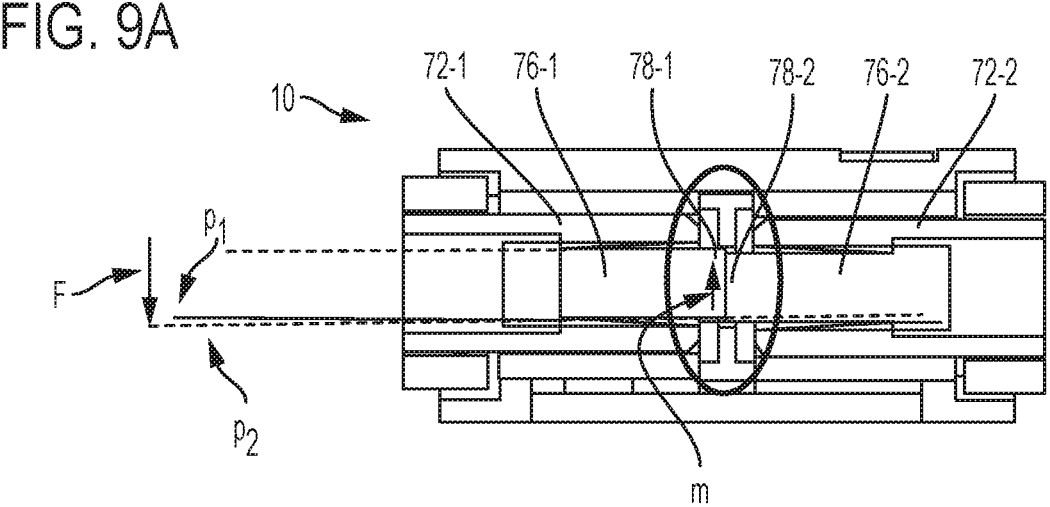
FIGS. 9A and 9B depict the internal configuration of an adapter for limitation of ferrule movement within the adapter according to an embodiment.
Figure 9B:
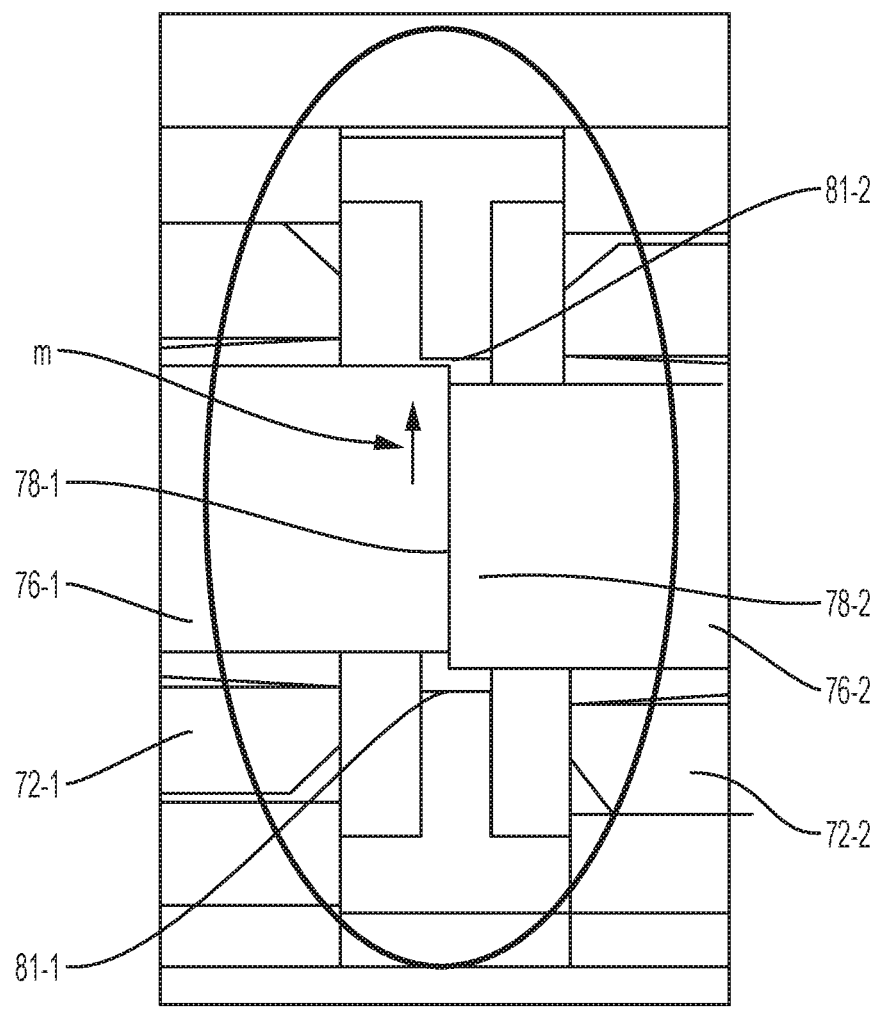

In an embodiment as represented in FIGS. 9A and 9B, to minimize or possibly eliminate such an increase in insertion loss caused by any side-load displacement, the wall portion 42*a* of the insertion plate 42 may be configured with a thickness $t_2$ (FIG. 7B) that is sufficient to minimize or block any lateral movements of a ferrule 76-1, 76-2 within the adapter 10. FIG. 9A depicts a side, cross-sectional view of an assembled adapter 10 and FIG. 9B shows an enlarged detail of the mating ferrule ends 78-1, 78-2.

In the represented embodiment in FIGS. 9A and 9B, a downward force F is applied to ferrule 76-1, displacing the ferrule from its original position $p_1$ causing the mating end 78-1 to move upwardly as represented by m and into a new position $p_2$. This movement is limited however by the wall portion 42*a* when the upper surface of ferrule end 78-1 contacts the surface 81-1. In the absence of the wall portion 42*a*, or if the wall portion 42*a* is not of a thickness $t_2$ sufficient to block this upward movement m, the mating ends 78-1 and 78-2 may become sufficiently displaced from one another to cause a decrease in signal quality being transferred between the ferrule 76-1, 76-2.

In an embodiment for an adapter for MPO connectors as shown, the thickness $t_2$ may be about 0.6 mm±0.1 mm. In embodiments, for example, the thickness $t_2$ may be about 0.5 mm, about 0.52 mm, about 0.54 mm, about 0.56 mm, about 0.58 mm, about 0.60 mm, about 0.62 mm, about 0.64 mm, about 0.66 mm, about 0.68 mm, or about 0.7 mm, or any value between any of the listed values.

In an embodiment, thickness $t_2$ may extend up to essentially the thickness $t_1$ of the wall insert 42, or alternatively, the thickness $t_1$ of the wall insert 42 may be minimized to be essentially only the thickness $t_2$ that is needed to minimize any movement m.

While the embodiment as shown and described may relate to a downward side load F (in relation to the orientation of the depiction shown on the drawing page) with an upward displacement m of the ferrule end 78, the same description and functioning may also be applied to any other side loads F (upwardly, or into or out of the page relative to the depiction as shown). In other words, any movement m may also be minimized or blocked in the opposite downward direction if the side load F were to be applied in an upward direction. In addition, any movement m into and out of the page of the figure may also be minimized or blocked if the side load F were to be applied in a sideways direction (also into or out of the page of the figure).

In an embodiment, the dimensions of the opening 43 (as discussed in detail above) may be configured in conjunction with the thickness $t_2$ to determine the amount of movement m, so that any movement m may be minimized, if not completely blocked. For example, the thickness $t_2$ may be less if the opening 43 is smaller and more closely matches the dimensions of the ferrule end providing a narrow gap between the surface 81-1 and the ferrule end 78-1, and alternatively, the thickness $t_2$ may need to be larger if the opening 43 is larger and defines a larger gap between the surface 81-1 and the ferrule end 78-1. By providing a configuration that minimizes or blocks movement of the ferrule ends within the adapter, the optical performance of the connection may be improved by countering side loads that may be exerted to one or both of the mated connectors.

In an embodiment, a reduced thickness $t_1$ of the wall insert 42, may allow for the thickness $t_3$ of the base 58 of a clip 20 to be increased (FIG. 4A). In an embodiment having short clips, for example, that may allow for easier insertion and assembly, the thickness $t_1$ may be about 5.2 mm, and the thickness $t_3$ of the base 58 of each clip 20 may be about 0.8 mm (Total $t_1+t_3+t_3$=about 6.8 mm). Such a relatively thin base 58 however, may allow for easier deformation under a side load that may be applied to the adapters 10 as discussed above, possibly resulting in a bending/bowing of the base that may, under sufficient load, allow for at least one of the arms 22a and 22b to be outwardly displaced away from the other arm, allowing the clip 20 to open, releasing a connector held therein. By increasing the thickness $t_3$ of the base 58, the base may be more resistive to bending/bowing, and thus less likely to open under loads. In an embodiment, the thickness $t_1$ may be decreased to about 2 mm, and the thickness $t_3$ of the base 58 of each clip 20 may be increased to about 2.4 mm (Total $t_1+t_3+t_3$=about 6.8 mm).

In an embodiment, the base thickness $t_3$ may be about 1.70 mm to about 1.80 mm. In various embodiments, for example, the base may have a thickness of about 1.70 mm, about 1.72 mm, about 1.74 mm, about 1.76 mm, about 1.78 mm, about 1.8 mm, or a value between any of the listed values.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An optical fiber adapter for optically coupling two optical fiber connectors, each optical fiber connector having an optical ferrule with a mating end for mating with the mating end of the optical ferrule of the other connector, and the adapter comprising:
a housing having a first end, a second end opposite the first end, and defining an axial cavity extending from the first end to the second end, each of the first end and the second end having at least one connector clip and being configured for receiving and selectively retaining one of the optical fiber connectors therein for mating of the mating ends of the optical ferrules at a mating location within the housing, and the housing comprising:
a wall portion disposed at the mating location and orthogonal to the axial cavity, the wall portion comprising an opening therein for the axial cavity and a perimetrical surface defining the opening, the opening having a cross-sectional configuration for unhindered passage of the mating ends of the optical ferrules therethrough, and the wall portion, at least adjacent the opening, having a wall thickness sufficient for engagement of the mating ends of the optical ferrules with the perimetrical opening upon displacement of the mating ends in any direction orthogonal to the axial direction to limit lateral movement of the mating ends and substantially maintain an optical coupling between the mating ends;
wherein a dimension of the perimetrical opening is greater than a dimension of the mating end of the optical ferrule by about 0.2 mm to about 0.6 mm.

2. The optical fiber adapter of claim 1, wherein the optical fiber adapter comprises a multi-fiber push-on (MPO) optical fiber adapter.

3. The optical fiber adapter of claim 1, wherein each optical fiber connector comprises a multi-fiber push-on (MPO) optical fiber connector.

4. The optical fiber adapter of claim 1, wherein each optical ferrule comprises a mechanically transferable (MT) ferrule.

5. The optical fiber adapter of claim 1, wherein each at least one connector clip further comprises a resilient tab.

6. The optical fiber of claim 5, wherein the resilient tab extends substantially orthogonally from a base.

7. The optical fiber adapter of claim 1, further comprising at least one mounting flange.

8. The optical fiber adapter of claim 1, further comprising a housing cover.

9. The optical fiber adapter of claim 8, wherein the housing cover is configured to enclose each at least one connector clip within the housing.

10. The optical fiber adapter of claim 8, wherein the housing cover comprises a housing cover wall portion and an insertion plate extending substantially orthogonally to the housing wall portion to fit between each at least one connector clip and at least one insertion gap.

11. The optical fiber adapter of claim 10, wherein the insertion plate comprises a thickness $t_1$ approximately equal to a width of the at least one insertion gap.

12. The optical fiber adapter of claim 11, wherein the insertion plate further comprises an inner wall portion having a thickness $t_2$, and wherein $t_2$ is less than $t_1$.

13. The optical fiber adapter of claim 12, wherein the thickness $t_2$ is configured to allow the perimetrical opening to engage with the optical ferrule disposed within the adapter.

14. The optical fiber adapter of claim 12, wherein the thickness $t_2$ is sufficient to block lateral movement of the optical ferrule when engaged with the adapter.

15. The optical fiber adapter of claim 12, wherein the thickness $t_2$ is from about 0.5 mm to about 0.7 mm.

16. The optical fiber of claim 8, wherein an internal profile of the insertion plate is larger than an internal profile of the at least one connector clip by an amount $d_1$, and wherein $d_1$ is sufficient to prevent the internal profile of the insertion plate from protruding into the axial cavity.

17. The optical fiber adapter of claim 1, wherein each at least one connector clip comprises a base and a connector clip wall portion extending substantially orthogonally from the base.

18. The optical fiber of claim 1, wherein a base of each at least one connector clip independently has a thickness from about 1.7 mm to about 1.8 mm.

\* \* \* \* \*